United States Patent
Wei (10) Patent No.: US 9,373,192 B2
(45) Date of Patent: Jun. 21, 2016

(54) SHAPE PRESERVING MESH SIMPLIFICATION

(71) Applicant: Google Inc., Mountain View, CA (US)

(72) Inventor: Xiaolin Wei, Fremont, CA (US)

(73) Assignee: Google Inc., Mountain View, CA (US)

( * ) Notice: Subject to any disclaimer, the term of this patent is extended or adjusted under 35 U.S.C. 154(b) by 383 days.

(21) Appl. No.: 13/915,653

(22) Filed: Jun. 12, 2013

(65) Prior Publication Data

US 2014/0368498 A1    Dec. 18, 2014

(51) Int. Cl.
*G06T 17/20*    (2006.01)

(52) U.S. Cl.
CPC .................................... *G06T 17/205* (2013.01)

(58) Field of Classification Search
None
See application file for complete search history.

(56) References Cited

U.S. PATENT DOCUMENTS

| | | | |
|---|---|---|---|
| 6,046,744 A | 4/2000 | Hoppe | |
| 6,362,820 B1 | 3/2002 | Hoppe | |
| 6,639,592 B1* | 10/2003 | Dayanand | G06T 17/30 345/419 |
| 7,138,999 B2 | 11/2006 | Alliez et al. | |
| 7,876,322 B2 | 1/2011 | Xie et al. | |
| 7,928,978 B2 | 4/2011 | Kim | |
| 8,269,771 B2 | 9/2012 | Oh et al. | |
| 2010/0156903 A1* | 6/2010 | Kanai | G06F 17/5018 345/420 |
| 2010/0277476 A1* | 11/2010 | Johansson | G06T 17/205 345/423 |
| 2012/0120074 A1* | 5/2012 | Huysmans | G06T 17/205 345/420 |
| 2013/0114910 A1* | 5/2013 | Mammou | G06T 9/004 382/233 |
| 2013/0124149 A1* | 5/2013 | Carr | G06F 17/50 703/1 |

OTHER PUBLICATIONS

Attene et al., "Sharpen&Bend: Recovering Curved Sharp Edges in Triangle Meshes Produced by Feature-Insensitive Sampling", IEEE Transactions on Visualization and Computer Graphics, vol. 11, Issue 2, Mar. 2008, pp. 181-192.
Cignoni et al., "Simplification of Tetrahedral Meshes with Accurate Error Evaluation", Proceedings of the 11$^{th}$ IEEE Visualization 2000 Conference, Oct. 8-13, 2000, Salt Lake City, Utah—9 pages.
Garland et al., "Surface Simplification Using Quadric Error Metrics", Proceedings of the 24$^{th}$ Annual Conference on Computer Graphics and Interactive Techniques, Aug. 3-8, 1997, Los Angeles, California—8 pages.

* cited by examiner

*Primary Examiner* — Phi Hoang
(74) *Attorney, Agent, or Firm* — Dority & Manning, P.A.

(57) ABSTRACT

Systems and methods for simplifying a three-dimensional mesh providing a three-dimensional model, such as a three-dimensional model of a cityscape, are provided. In particular, mesh simplification techniques can preserve important structural shapes in the original three-dimensional mesh. Important features in a representation of a city scene or other scene can be represented by structural edges (e.g. building outlines, bridges, curved structures such as curved highway overpasses, etc.). These structural edges can be detected and a representation of the structural edges can be constructed in the mesh. The mesh can then be simplified using the structural edges as high-level simplification criterion such that the structural edges are preserved during simplification.

13 Claims, 7 Drawing Sheets

ROOF EDGE    TERRAIN EDGE

SHAPE PRESERVING MESH SIMPLIFICATION

FIELD

The present disclosure relates generally to three-dimensional modeling, and more particularly to mesh simplification of three-dimensional models.

BACKGROUND

Geographic information systems provide for the archiving, retrieving, and manipulating of data that has been stored and indexed according to geographic coordinates of its elements. A geographic information system can be used for storing, manipulating, and displaying a three-dimensional model. The three-dimensional model can include images (e.g. satellite images, aerial images, or other images captured by a camera) that are texture mapped to geometry (e.g. terrain, buildings, structures, and other objects). The geometry of the three-dimensional model can be represented by a polygon mesh. The polygon mesh can include a plurality of polygons (e.g. triangles) that are interconnected by vertices and edges.

A polygon mesh representing a geographic area can have dense vertices and edges when they are constructed using three-dimensional scanning, stereo reconstruction, or geometry modeling techniques. For instance, a three-dimensional model of a cityscape can represent hundreds of square kilometers including many objects (e.g. buildings, cars, trees). As a result, the three-dimensional model of the cityscape can require a polygon mesh with a huge number of vertices and edges.

Mesh simplification can be necessary to reduce the size of a dense mesh in order to allow the mesh to be stored, processed, served, and rendered. Three-dimensional models of a cityscape and other scenes can model important and high-level structures, such as skylines, building outlines, and bridges. Typical mesh simplification techniques can result in objects modeled by the mesh losing their shape. This can negatively affect the appearance of the high-level structures, such as skylines, building outlines, bridges, etc., modeled by the three-dimensional model.

SUMMARY

Aspects and advantages of the invention will be set forth in part in the following description, or may be obvious from the description, or may be learned through practice of the invention.

One exemplary aspect of the present disclosure is directed to a computer-implemented method for mesh simplification of a three-dimensional polygon mesh. The method includes identifying a structural edge in the three-dimensional polygon mesh using plane detection and constructing a sharp edge in the three-dimensional polygon mesh at the structural edge. The method further includes identifying a candidate edge for edge collapse. The candidate edge is associated with a first vertex and a second vertex. The method further includes determining an error for collapsing the candidate edge to a new vertex. The error is determined based at least in part on the location of the first vertex and the second vertex relative to the sharp edge. The method further includes collapsing one or more edges in the three-dimensional polygon mesh based at least in part on the error.

Other exemplary aspects of the present disclosure are directed to systems, apparatus, non-transitory computer-readable media, user interfaces and devices for shape-preserving mesh simplification.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for simplifying a three-dimensional polygon mesh providing a three-dimensional model, such as a three-dimensional model of a city scene. In particular, aspects of the present disclosure are directed to mesh simplification techniques that preserve important structural shapes in the original three-dimensional mesh. Important features in a representation of a city scene or other scene can be represented by structural edges (e.g. building outlines, bridges, curved structures such as curved highway overpasses, etc.). These structural edges can be detected and a representation of the structural edges can be constructed in the mesh. The mesh can then be simplified using the structural edges as high-level simplification criterion such that the structural edges are preserved during simplification.

More particularly, a shape detection algorithm can be used to identify key structural features in the original mesh. For instance, plane fitting techniques can be performed and sharp edges can be constructed where detected planes intersect. The sharp edges can be constructed as a straight chain of interconnected vertices. A sharp edge representative of a curved feature can be constructed as a chain of sharp edges. After shape detection and construction of sharp edges, filtering can be performed based on characteristics of the sharp edges (e.g. length, height, area of corresponding planes, etc.) to identify the most important sharp edges.

Once the important sharp edges have been identified, mesh simplification can be conducted using vertex collapse simplification techniques. Vertex collapse simplification involves selecting two or more vertices and collapsing the edge(s) between the vertices to create a new vertex. Candidate edges can be selected for vertex collapse based on an error, such as a quadrics error, determined for the vertex collapse. Typically, the location of the new vertex is determined to minimize the error.

According to aspects of the present disclosure, a special error can be determined for the collapse of certain edges based at least in part on the location of the edge relative to a sharp edge. In particular, the error can be computed such that the location of the new vertex is determined based on its location relative to a sharp edge. For instance, if the mesh edge to be collapsed is located on a sharp edge, a special error is computed such that the new vertex is located on the sharp edge. If one and only one vertex of the mesh edge sits on a sharp edge, the error is determined such that the new vertex is located at the location of the vertex on the sharp edge. If the edge has vertices that are located on two different sharp edges, the error can be determined such that the error is not collapsible. For instance, a very large error can be assigned to the edge such that the edge is not collapsed during mesh simplification.

In this manner, sharp edges can be preserved during mesh simplification. As a result, simplified meshes can be generated that have much higher quality with the same vertex budget. In other words, better looking meshes can be achieved with the same compression ratio. For approximately the same visual quality as the original mesh, meshes simplified according to exemplary aspects of the present disclosure have much less vertices and edges, reducing storage space and required bandwidth for processing, storing, and serving the mesh.

Figure 1:
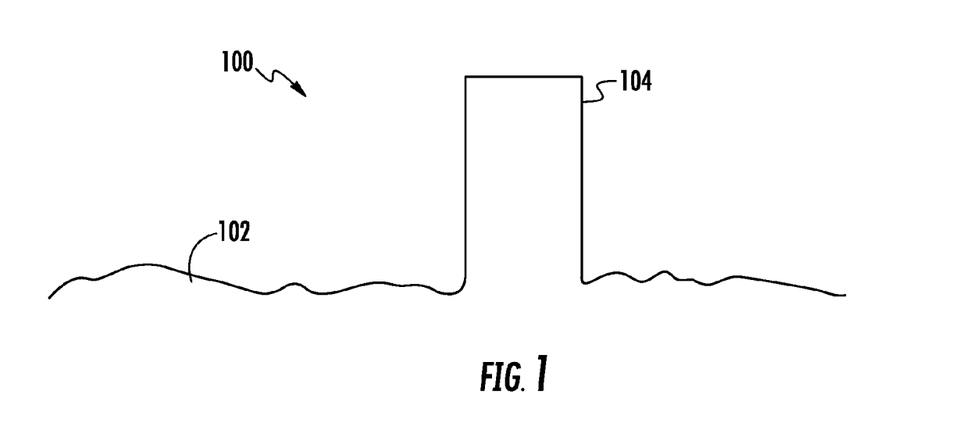
FIG. 1 depicts a representation of an exemplary three-dimensional model of cityscape.

With reference now to the Figures, exemplary embodiments of the present disclosure will now be set forth. FIG. 1 depicts an exemplary three-dimensional model 100. The three-dimensional model 100 can be representative of a geographic area, such as a cityscape. The three-dimensional model 100 can include a polygon mesh that includes a plurality of polygons (e.g. triangles) interconnected by vertices and edges. The model 100 includes a terrain portion 102 representative of terrain and a building portion 104 representative of, building(s).

The three-dimensional model 100 can be a stereo reconstruction generated from aerial or satellite imagery of a geographic area. The imagery can be taken by overhead cameras, such as from an aircraft, at various oblique or nadir perspectives. In the imagery, features can be detected and correlated with one another. The points can be used to determine a stereo mesh from the imagery. In this way, a three-dimensional model can be determined from two-dimensional imagery.

It can be desirable to simplify the three-dimensional model 100 to facilitate the processing, storing, serving, and rendering of the three-dimensional model. More particularly, it can be desirable to reduce the number of polygons, edges, and/or vertices in the three-dimensional model 100.

Edge collapse techniques using quadrics errors can be used to simplify the three-dimensional model. In a typical edge collapse algorithm using quadrics errors, quadrics error matrices can be computed for each vertex by accumulating the planes for the polygons that meet at the vertex. For each plane, a fundamental error quadric can be determined representative of the squared distance from any point in space to the plane. The quadric error for the vertex can be the sum of the fundamental error quadrics. Valid vertex pairs can be selected for contraction. An optimal contraction target can be computed for each valid pair to minimize the error associated with contracting the valid pair. The error associated with the optimal contraction target becomes the cost of contracting that pair. The valid pair with the least cost is contracted using edge collapse techniques and is replaced by a new vertex at the optimal contraction target. The errors for all the vertices are then updated and the process repeats itself until a target budget for the polygon mesh is satisfied.

Figure 2:
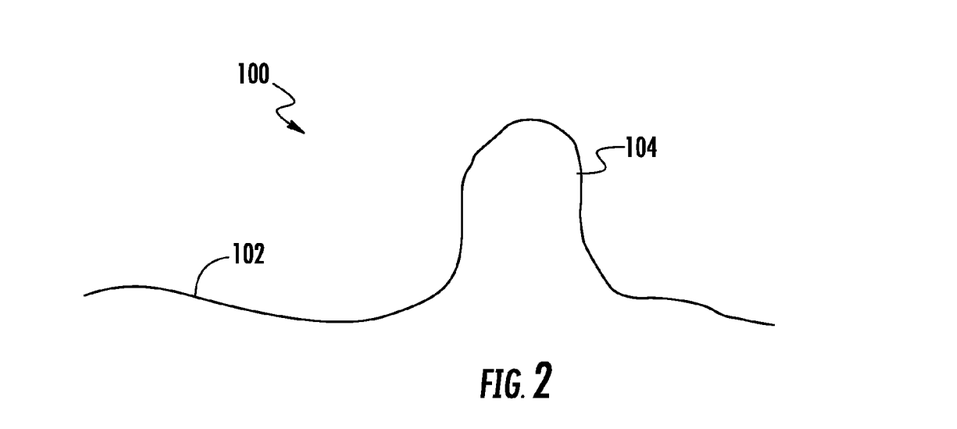
FIG. 2 depicts a representation of an exemplary three-dimensional model of a cityscape after mesh simplification.

FIG. 2 depicts the three-dimensional model 100 after undergoing mesh simplification techniques using, for instance, edge collapse based on quadrics errors. As shown, the terrain portion 102 of the model 100 has been simplified. Some of the detail of the terrain has been lost, but the terrain portion 102 of the model 100 is still fairly representative of the terrain of the geographic area. The building portion 104 of the three-dimensional model 100 has also been simplified. However, the building portion 104 has lost its original shape, giving the building a melted appearance.

Figure 3:
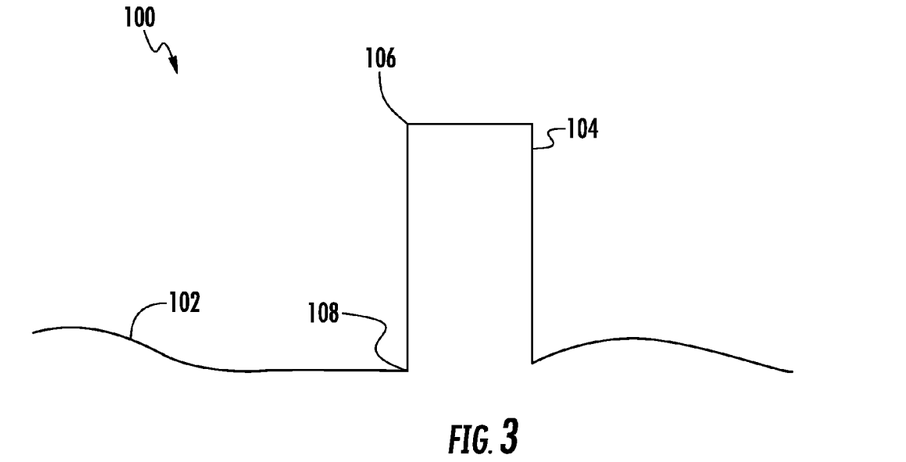
FIG. 3 depicts an a representation of an exemplary three-dimensional model of a cityscape after mesh simplification according to an exemplary embodiment of the present disclosure.

According to aspects of the present disclosure, mesh simplification techniques can be performed that preserve structural edges in the three-dimensional model 100. FIG. 3 depicts a simplified representation of the three-dimensional model 100 after undergoing shape preserving mesh simplification techniques according to exemplary embodiments of the present disclosure. As shown, the terrain portion 102 has been simplified, but still provides a visually acceptable representation of the terrain. In addition, structural edges associated with the building portion 104 of the model 100 have been preserved. In particular, sharp edges representative of building edges (e.g. roof edge 106 and terrain edge 108) have been preserved such that the building generally retains its original shape.

Figure 4:
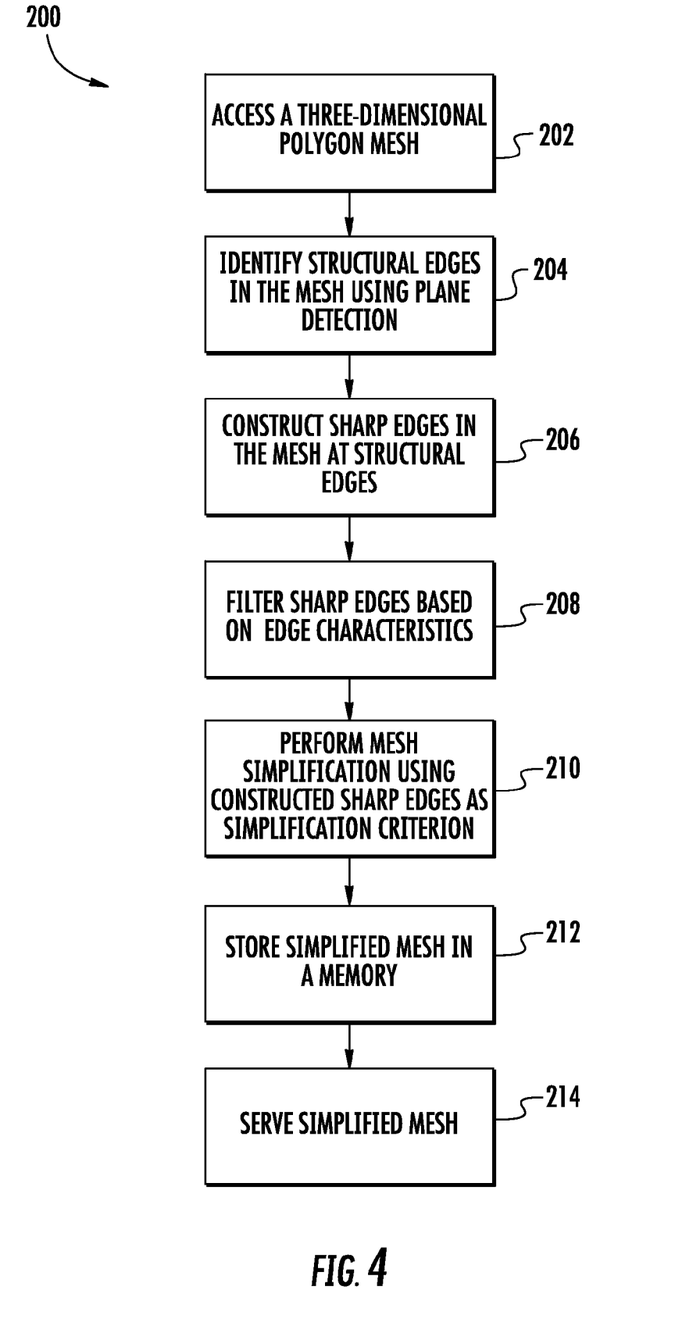
FIG. 4 depicts a flow diagram of an exemplary method for mesh simplification according to an exemplary embodiment of the present disclosure.

FIG. 4 depicts a flow diagram of an exemplary method (200) for shape preserving mesh simplification according to an exemplary embodiment of the present disclosure. The method (200) can be implemented by any suitable computing device or system, such as the computing system depicted in FIG. 12. In addition, FIG. 4 depicts steps performed in a particular order for purposes of illustration and discussion. Those of ordinary skill in the art, using the disclosures provided herein, will understand that the various steps of any of the methods disclosed herein can be adapted, omitted, rearranged, or modified in various ways without deviating from the scope of the present disclosure.

At (202), a three-dimensional polygon mesh is accessed. For instance, a three-dimensional model generated using stereo reconstruction techniques can be accessed from a memory. The three-dimensional polygon mesh can model a geographic area, such as a cityscape, using a plurality of interconnected polygons (e.g. triangles). The polygons can be interconnected by vertices and edges.

Figure 5:
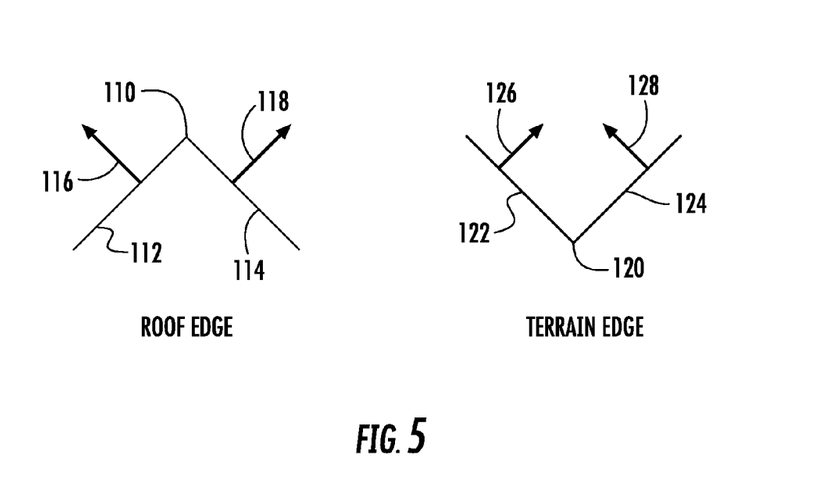
FIG. 5 depicts exemplary structural edges in a three-dimensional model according to an exemplary embodiment of the present disclosure.

At (204), structural edges in the mesh are identified. Structural edges are edges in the mesh that may be associated with structural features that should be preserved during mesh simplification. Exemplary structural edges are depicted in FIG. 5. In particular, FIG. 5 depicts a roof edge 110 and terrain edge 120. The roof edge 110 can be at an intersection of planes 112 and 114 in the three-dimensional model. The terrain edge 120 can be at an intersection of planes 122 and 124 in the three-dimensional model. Ideally, a roof edge 110 is an edge associated with faces having normals pointing away from each other. For instance, roof edge 110 can be associated with face normals 116 and 118. Terrain edge 120 is an edge associated with faces having normals pointing towards each other. For instance, terrain edge 120 can be associated with face normals 126 and 128.

The structural edges in the three-dimensional model can be detected using a plane detection algorithm. The plane detection algorithm can analyze the three-dimensional model to identify polygons in the three-dimensional model that belong in the same plane. After the planes in the three-dimensional model have been identified, an intersecting line can be computed between pairs of the detected planes. For each pair, it can then be determined whether there are a threshold number of points in each detected plane that are within a threshold distance of the intersecting line. If so, a structural edge can be identified at the intersection of the detected planes. Otherwise, the intersection of the detected planes is not identified as a structural edge.

At (206) sharp edges are constructed in the mesh at the location of the identified structural edges. In particular, the sharp edges are constructed at the intersection of the detected planes associated with the structural edges. A sharp edge is a straight chain of connected vertices used to model the identified structural edge in the mesh. For curved structural features, such as a highway overpass, a chain of sharp edges can be constructed to model the curved structural feature. The sharp edge can be constructed by generating a straight chain of vertices along the intersecting line between the detected planes.

In a particular embodiment of the present disclosure, the sharp edge is preferably constructed using an edge construction technique that constructs the sharp edge according to its appropriate edge type (e.g. either as a roof edge or as a terrain edge) and such that the topology of the original model is preserved and the sharp edge is incorporated into the mesh as seamlessly as possible. An exemplary edge construction technique that constructs a sharp edge at the intersection of two detected planes can employ a trial and error strategy that analyzes both a roof edge type and a sharp edge type and selects a particular edge type based on the best fit with the detected planes. The edge construction technique can include identifying a set of edge segments to construct the sharp edge from the pair of planes. For each edge segment, a set of vertices can be identified. The set of vertices can include one vertex from each detected plane in the pair of planes close to each end of the edge segment. A closing path can be determined to wrap the area where the edge segment is to be constructed from the set of vertices. This process can be performed for both a terrain type edge and a roof edge type. The best edge type can be selected and the mesh can be modified by removing all of the polygons inside the closing path, constructing the edge segment along the intersecting line, and filling in holes in the mesh on each plane.

Figure 6:
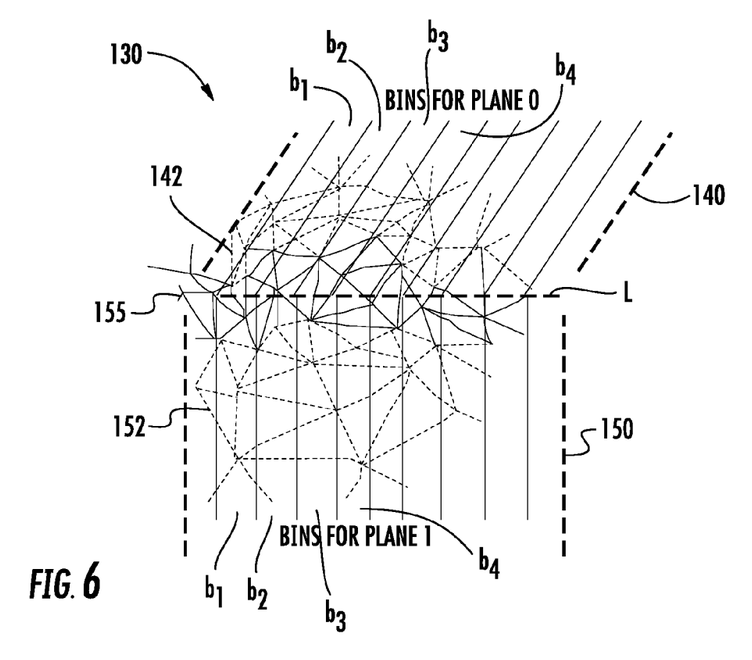
FIGS. 6 and 7 depict the exemplary construction of a sharp edge according to an exemplary embodiment of the present disclosure.

More specifically, FIG. 6 depicts an exemplary polygon mesh 130 including a first detected plane 140 and a second detected plane 150 associated with a structural edge. Mesh triangles 142 are located in the first detected plane 140. Mesh triangles 152 are located in the second detected plane 150. Mesh triangles 155 are not associated with either the first detected plane 140 or the second detected plane 150. An intersecting line L can be computed between the first detected plane 140 and the second detected plane 150. The edge construction process can construct a sharp edge for the first detected plane 140 and the second detected plane 150 along the intersecting line L.

The sharp edge construction process can begin by assuming that a structural edge at the intersection of the first detected plane 140 and the second detected plane 150 is associated with a roof edge type. The direction of the intersecting line L can be determined to be consistent with a roof edge type. For each of the first detected plane 140 and the second detected plane 150, vertices in the respective planes can be segmented into uniform bins. FIG. 6 depicts first detected plane 140 and second detected plane 150 segmented into uniform bins along the intersecting line L. For each of the first detected plane 140 and the second detected plane 150, the vertex closest to the intersecting line L from each bin is identified.

Edge segments are then identified along the intersecting line L between bins. The edge segment can extend across multiple bins. For instance, in the example of FIG. 6, the edge segment can extend from bin b1 to bin b4. Bins b2 and b3 would be included as part of the edge segment. The edge segment can be identified to be close enough to both planes locally based at least in part on the identified vertices of the first detected plane 140 and the second detected plane 150 that are closest to the intersecting line L.

Once the edge segments are identified, one vertex from each detected plane close to each end of the edge segment can be identified. For instance, referring to FIG. 7, v0 can be identified as the closest point to the intersecting line L in bin b1 for the first detected plane 140, v1 can be identified as the closest point to the intersecting line L in bin b1 for the second detected plane 150, v2 can be identified as the closest point to the intersecting line L in bin b4 for the first detected plane 140, and v3 can be identified as the closest point to the intersecting line L in bin b4 for the second detected plane 150.

Figure 7:
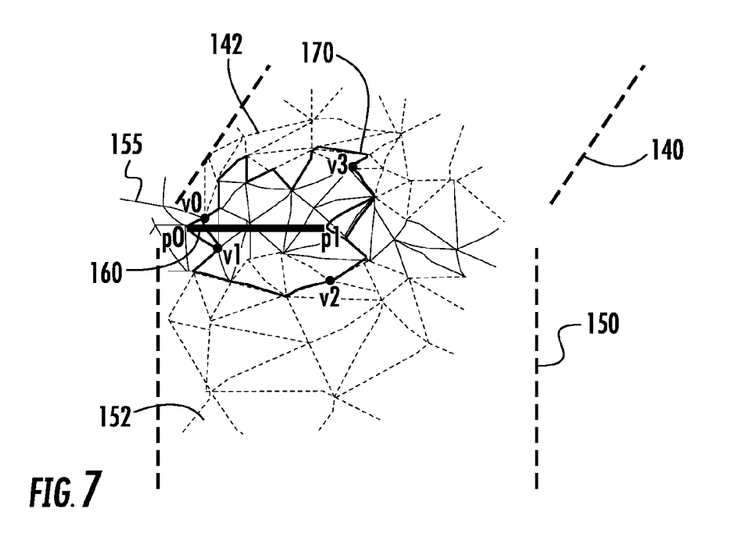

A closing path 170 can then be determined from the identified vertices v0, v1, v2, and v3. The closing path 170 meets two conditions. First, paths from v1 to v2 and paths from v3 to v0 should stay on their respective detected plane. Second, the direction of the closing path should agree with the normal of the adjacent faces. For example, v3 to v2 to v1 to v0 would be the wrong direction for a roof edge type. The closing path can be determined by finding the shortest path on the mesh between v0 and v1 and between v2 and v3 respectively. Next, the shortest path from v3 to v0 through vertices in the first detected plane 140 and the shortest path from v1 to v2 through vertices in the second detected plane 150 can be identified. The paths from v3 to v0 and v1 to v2 cannot go to the wrong side of their respective plane.

Once the closing paths for all edge segments have been determined, the number of local points for all the identified edge segments along the intersecting line L can be identified. Local points are defined as points on the first detected plane 140 or the second detected plane 150 that are within closing path and agree with the roof edge type. After the number of local points are identified, the above process is repeated with the assumption that the structural edge at the intersection of the first detected plane 140 and the second detected plane 150 is associated with a terrain edge type. The number of local points associated with the terrain edge type can then be determined after identifying closing paths for edge segments with the structural edge as a terrain edge type. The structural edge can then be classified as a roof edge type or a terrain edge based on the number of local points associated with each edge type. For instance, the edge type with the fewest number of local points can be identified for constructing the sharp edge.

After the structural has been classified (e.g. either roof edge type or terrain edge type), the polygon mesh is modified to construct the sharp edge. Referring to FIG. 7, all of the vertices within the closing path 170 can be removed. The sharp edge 160 can then be constructed along the identified edge segment(s). The sharp edge 160 can include a straight chain of vertices that extends from point p0 to point p1. After construction of the sharp edge 160, holes left on each side of the sharp edge 160 in the mesh 140 can be filled.

Referring back to FIG. 4 at (208), after all of the sharp edges have been constructed in the three-dimensional model, the sharp edges can be filtered based on characteristics of the sharp edges to identify the most important sharp edges for preservation during mesh simplification. The sharp edges can be filtered using any criteria. For instance, the sharp edges can be filtered based on the length of the sharp edges, height of the sharp edges, size of the planes corresponding to the sharp edges or other characteristics indicative of size of the sharp edges. The sharp edges can be filtered such that only sharp edges that have a threshold size (e.g. defined in terms of length, height, area of planes) are identified as important sharp edges for preservation during mesh simplification.

At (210), the method includes performing mesh simplification using the constructed sharp edges as simplification criterion. The mesh simplification can be performed using quadrics errors as discussed above. However, to preserve the shape of sharp edges, the errors used for mesh simplification can be determined based at least in part on the relative location of a candidate edge for collapse relative to one or more sharp edges constructed in the mesh.

Figure 8:
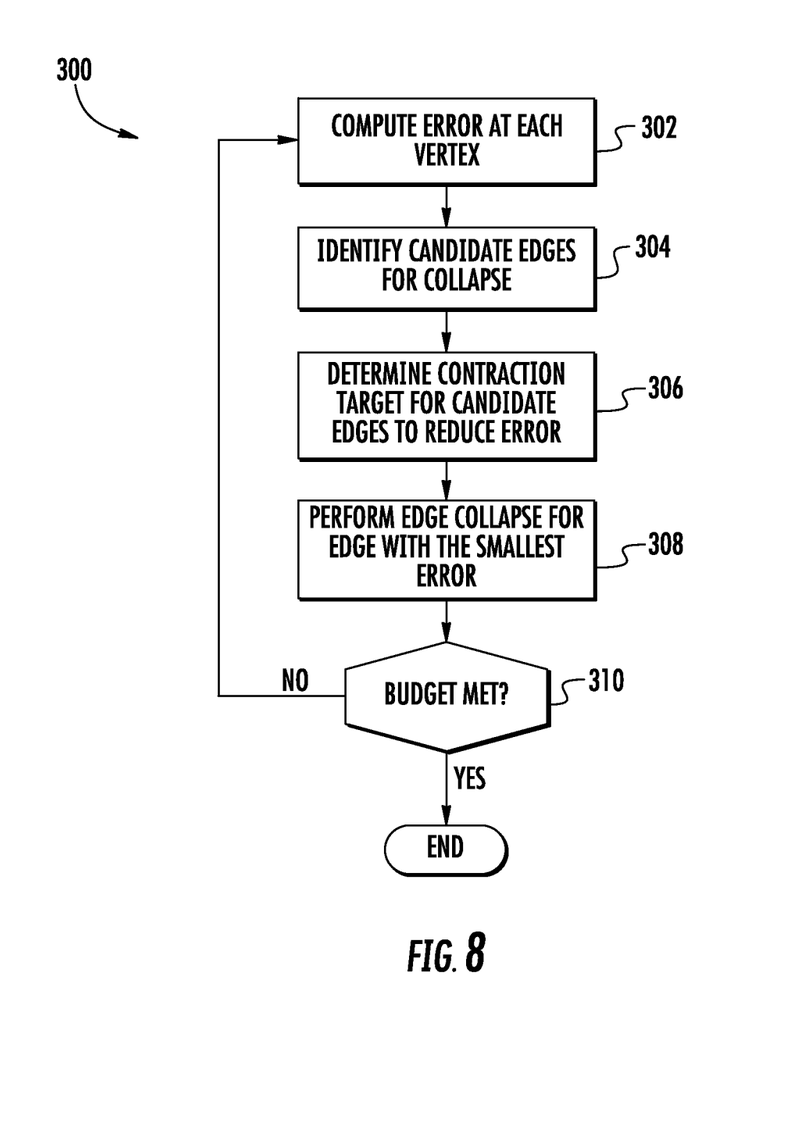
FIG. 8 depicts a flow diagram of performing mesh simplification using sharp edges as simplification criterion according to an exemplary embodiment of the present disclosure.

FIG. 8 depicts a flow diagram of an exemplary method (300) for performing mesh simplification according to an exemplary embodiment of the present disclosure. At (302), the method includes computing an error at each vertex. The error computed at each vertex can be a quadrics error. More particularly, error matrices can be computed for each vertex by accumulating the planes for the polygons that meet at the vertex. For each plane, a fundamental error quadric can be determined representative of the squared distance from any point in space to the plane. The quadric error for the vertex can be the sum of the fundamental error quadrics.

At (304), the method includes identifying candidate edges for edge collapse. In particular, valid vertex pairs in the mesh for edge collapse are identified. Each edge between each valid vertex pair can be identified as a candidate edge for edge collapse. Edge collapse involves collapsing an edge connecting vertices in the polygon mesh into a single point or new vertex. In particular, a candidate edge associated with a first vertex and a second vertex can be collapsed to a new vertex.

At (306), the method includes determining an error for collapsing the candidate edges. The error can be determined based on the location of the new vertex (i.e. the target contraction point) for each candidate edge. According to aspects of the present disclosure, the error for collapsing each candidate edge is determined based on the location of the candidate edge relative to a sharp edge constructed in the mesh. Exemplary criteria for determining the error for collapsing the candidate edge will now be set forth.

Figure 9:
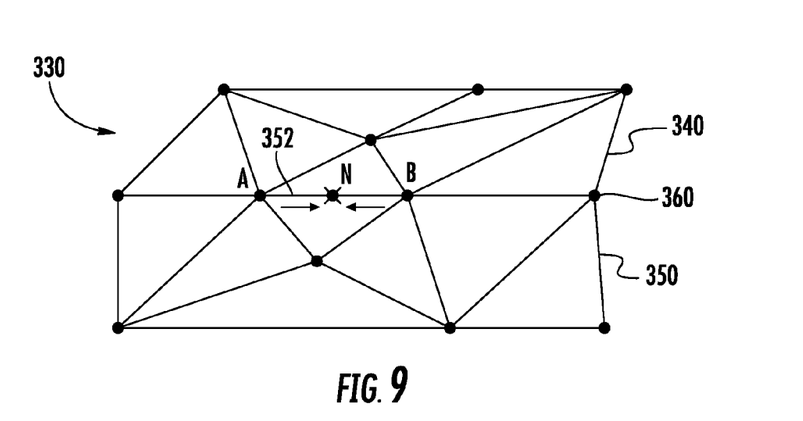
FIGS. 9-11 depict exemplary mesh simplification criteria according to an exemplary embodiment of the present disclosure.

When both the first vertex and the second vertex are located on a sharp edge, the error is computed such that the new vertex is also located on the sharp edge. This criterion is illustrated in FIG. 9, which depicts a mesh 330 having a sharp edge 360 located at an intersection of a first plane 340 and a second plane 350. The mesh 330 includes a candidate edge for collapse 352. The candidate edge for collapse 352 has a first vertex A and a second vertex B. Because both the first vertex A and the second vertex B are located on the sharp edge 360, the error is determined such that the location of the new vertex N will also be located on the sharp edge 360. The exact location on the sharp edge of the new vertex N can be determined to minimize the quadrics error associated with the new vertex N.

Figure 10:
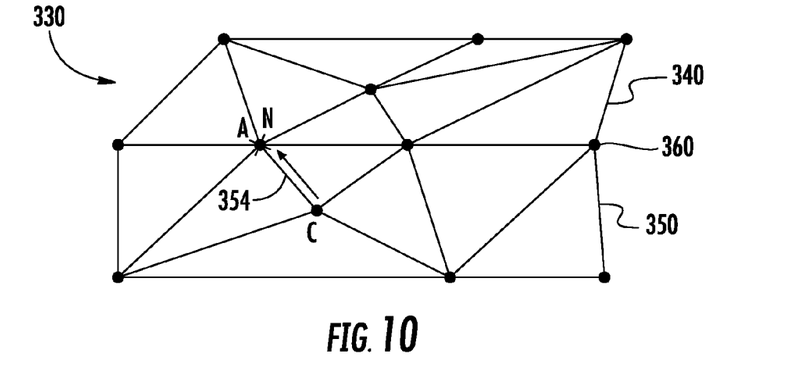

When the candidate edge includes one and only one vertex located on a sharp edge, the error is computed such that the new vertex is located at the location of the vertex on the sharp edge. In other words, the error is computed such that the edge is collapsed to the vertex on the sharp edge. This criterion is illustrated in FIG. 10. As shown, the mesh 330 includes a candidate edge for collapse 354. The candidate edge for collapse 354 has a first vertex A and a second vertex C. The first vertex A is located on the sharp edge 360. The second vertex C is not located on a sharp edge. Accordingly, the error is determined such that the new vertex N is located on the sharp edge 360 at the location of the first vertex A.

Figure 11:
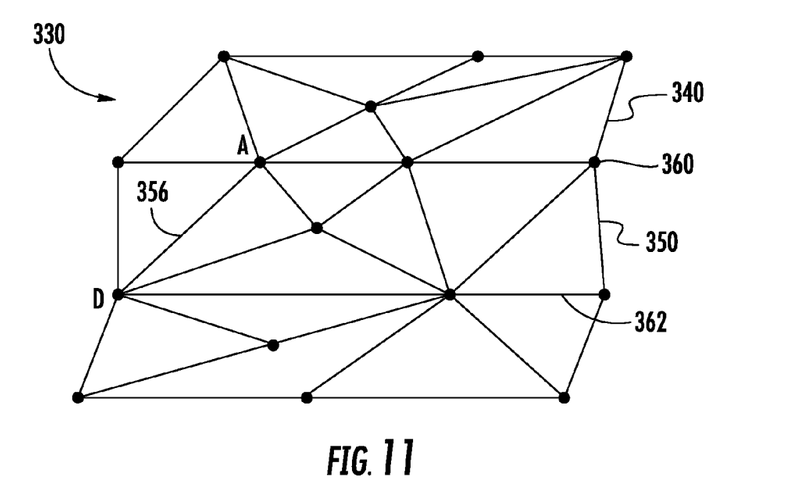

When the candidate edge includes a first vertex located on a first sharp edge and a second vertex located on a different sharp edge, the error is computed such that the candidate edge is not collapsible. In other words, a very high error can be assigned to the candidate edge such that the candidate edge is not selected for edge collapse. This criterion is illustrated in FIG. 11. As shown the mesh 330 includes a candidate edge for collapse 356. The candidate edge for collapse 356 includes a first vertex A located on sharp edge 360. The candidate edge for collapse includes a second vertex D located on sharp edge 362. Accordingly, the error is determined such that the candidate edge is not collapsible.

Referring back to FIG. 8 at (308), once the error for the candidate edges have been determined, edge collapse is performed for the candidate edge associated with the smallest error. In particular, the candidate edge associated with the smallest error can be collapsed to a new vertex, thus simplifying the mesh.

At (310), it is determined whether a budget for the mesh is met. For instance, it can be determined whether the mesh has been simplified to a threshold number of vertices, polygons, and/or edges. If so, the mesh simplification is completed. Otherwise, the steps of are iteratively repeated until the budget for the mesh is met.

Referring back to FIG. 4 at (212), the simplified mesh can be stored in a memory. The mesh can then be served to one or more remote devices over, for instance, a network (214). The simplified mesh can be rendered on display devices so that a user can navigate the simplified three-dimensional model.

Figure 12:
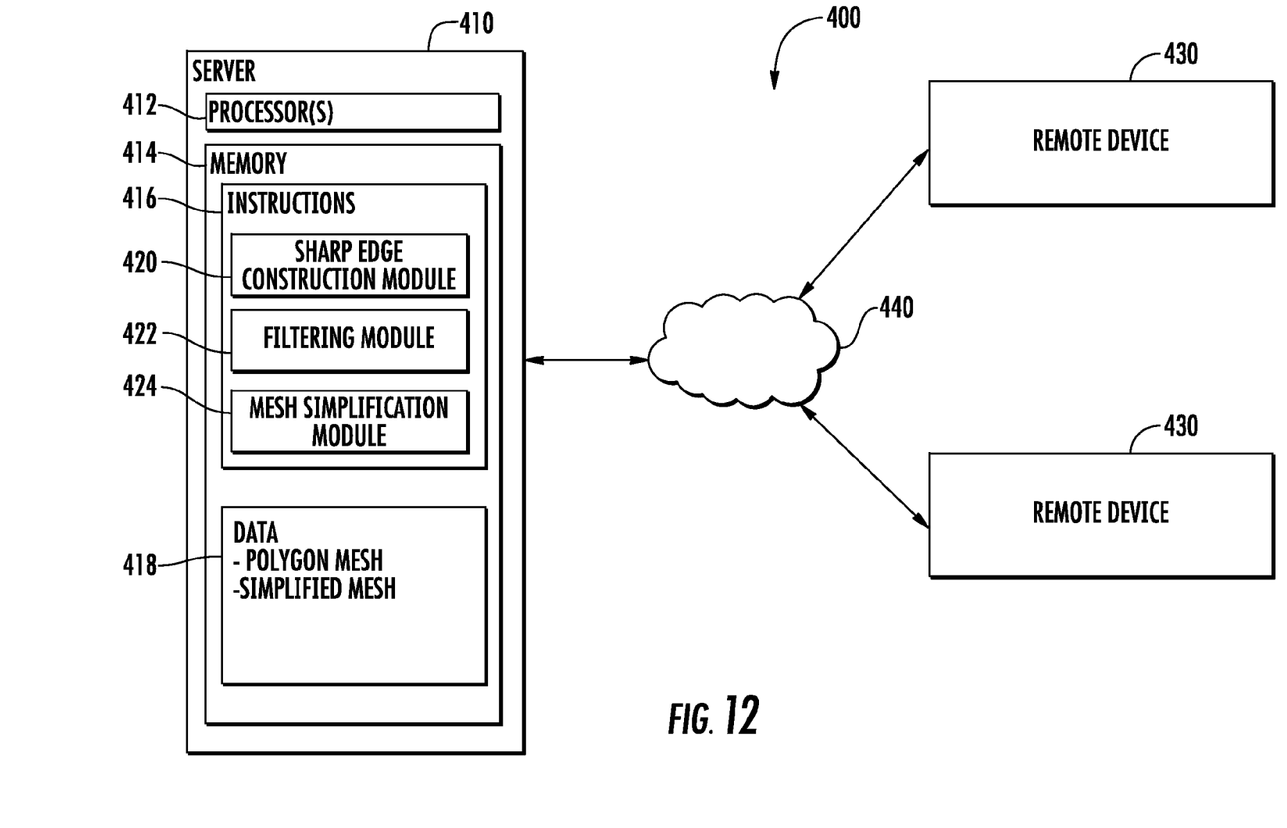
FIG. 12 depicts an exemplary computer based system for mesh simplification according to an exemplary embodiment of the present disclosure.

FIG. 12 depicts an exemplary computing system 400 that can be used to implement the methods and systems for shape preserving mesh simplification according to exemplary aspects of the present disclosure. The system 400 includes a computing device 410. The computing device 410 can be any machine capable of performing calculations automatically. For instance, the computing device can include a general purpose computer, special purpose computer, laptop, desktop, integrated circuit, mobile device, smartphone, tablet, or other suitable computing device. The computing device 410 can have a processor(s) 412 and a memory 414. The computing device 410 can also include a network interface used to communicate with one or more remote computing devices (e.g. client devices) 430 over a network 440. The network interface can include any suitable components for interfacing with one more networks, including for example, transmitters, receivers, ports, controllers, antennas, or other suitable components. In one exemplary implementation, the computing device 410 can be a server, such as a web server, used to host a geographic information system.

The processor(s) 412 can be any suitable processing device, such as a microprocessor, microcontroller, integrated circuit, or other suitable processing device. The memory 414 can include any suitable computer-readable medium or media, including, but not limited to, RAM, ROM, hard drives, flash drives, or other memory devices. The memory 414 can store information accessible by processor(s) 412, including instructions 416 that can be executed by processor(s) 412. The instructions 416 can be any set of instructions that when executed by the processor(s) 412, cause the processor(s) 412 to provide desired functionality. For instance, the instructions 416 can be executed by the processor(s) 412 to implement a sharp edge construction module 420, a filtering module 422, and a mesh simplification module 424.

The sharp edge construction module 420 can be configured to identify a structural edge in a three-dimensional polygon mesh using plane detection techniques or other suitable techniques. The sharp edge construction module 420 can be further configured to construct a sharp edge in the three-dimensional polygon mesh at a detected plane intersection associated with the structural edge. The sharp edge construction module 420 can construct the sharp edge using any of the techniques disclosed herein, such as the techniques discussed with reference to FIGS. 6 and 7.

The filtering module 422 of FIG. 12 can be configured to configured to filter the constructed sharp edges based on the size or other characteristics of the shape edge. For instance, the filtering module 422 can be configured to filter the sharp edges based on one or more of length of the sharp edges, height of the sharp edges, or areas of planes corresponding to the sharp edges. In this way, the filtering module 422 can identify the most important sharp edges to be preserved during mesh simplification.

The mesh simplification module 424 can be configured to perform the shape preserving mesh simplification techniques disclosed herein, such as the mesh simplification techniques discussed with reference to FIG. 8. For instance, the mesh simplification module 424 of FIG. 12 can be configured to identify a candidate edge for edge collapse. The mesh simplification module 424 can be further configured to determine an error for collapsing the candidate edge to a new vertex. The error can be determined based at least in part on the location of the candidate edge relative to the sharp edge. The mesh simplification module 424 can be further configured to collapse one or more edges in the three-dimensional polygon mesh based at least in part on the error.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 414 can also include data 418 that can be retrieved, manipulated, created, or stored by processor(s) 412. For instance, memory 414 can store data 418 associated with the three-dimensional model including a polygon mesh and any simplified polygon meshes generated according to exemplary aspects of the present disclosure. The data 418 can be stored in one or more databases. The one or more databases can be connected to the computing device 410 by a high bandwidth LAN or WAN, or can also be connected to computing device 410 through network 440. The one or more databases can be split up so that it is located in multiple locales.

The computing device 410 can exchange data with one or more client devices 430 over the network 440. Although two clients are illustrated in FIG. 12, any number of clients 430 can be connected to the computing device 410 over the network 440. The client devices 430 can be any suitable type of computing device, such as a general purpose computer, special purpose computer, laptop, desktop, integrated circuit, mobile device, smartphone, tablet, or other suitable computing device. Responsive to a request for information, the computing device 410 can encode data in one or more data files and provide the data files to the client devices 430 over the network 440.

The client devices 430 can also include a processor and a memory. The client devices 430 can also include a display device for displaying the three-dimensional model. The user can navigate the three-dimensional model by navigating a virtual camera relative to the three-dimensional model using a suitable user interface.

The network 440 can be any type of communications network, such as a local area network (e.g. intranet), wide area network (e.g. Internet), or some combination thereof. The network 440 can also include a direct connection between a client device 430 and the computing device 410. In general, communication between the computing device 410 and a client device 430 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for mesh simplification of a three-dimensional polygon mesh, the method comprising:

identifying, by one or more computing devices, a structural edge in the three-dimensional polygon mesh using plane detection;

constructing, by the one or more computing devices, a sharp edge in the three-dimensional polygon mesh at the structural edge, the sharp edge comprising a straight chain of connected vertices in the three-dimensional polygon mesh;

identifying, by the one or more computing devices, a candidate edge for edge collapse, the candidate edge being associated with a first vertex and a second vertex;

determining, by the one or more computing devices, an error for collapsing the candidate edge to a new vertex, the error determined such that the new vertex is located on the sharp edge; and collapsing, by the one or more computing devices, one or more edges in the three-dimensional polygon mesh based at least in part on the error;

wherein when the first vertex is located on the sharp edge and the second vertex is not located on the sharp edge, determining an error for collapsing the candidate edge to a new vertex comprises determining the error such that the new vertex is located at the first vertex.

2. The computer-implemented method of claim 1, wherein the sharp edge is associated with a curved structural feature.

3. The computer-implemented method of claim 2, wherein the sharp edge for the curved structural feature is constructed as a chain of sharp edges.

4. The computer-implemented method of claim 1, wherein constructing, by the one or more computing devices, the sharp edge in the three-dimensional polygon mesh at the structural edge, comprises:
   identifying, by the one or more computing devices, an edge segment to be constructed at a detected plane intersection between a first detected plane and a second detected plane;
   identifying, by the one or more computing devices, a set of vertices for the edge segment, the set of vertices comprising one vertex from each of the first detected plane and the second detected plane closest to an end of the edge segment;
   determining, by the one or more computing devices, a closing path for the edge segment based at least in part on the set of vertices; and
   modifying, by the one or more computing devices, the three-dimensional polygon mesh based on the closing path.

5. The computer-implemented method of claim 4, wherein modifying, by the one or more computing devices, the three-dimensional mesh based on the closing path comprises:
   removing, by the one or more computing devices, a portion of the three-dimensional polygon mesh within the closing path; and
   constructing, by the one or more computing devices, the sharp edge along the edge segment in the three-dimensional polygon mesh.

6. The computer-implemented method of claim 1, wherein the method comprises filtering, by the one or more computing devices, the sharp edge based on one or more of length of the sharp edge, height of the sharp edge, or areas of planes corresponding to the sharp edge.

7. The computer-implemented method of claim 1, wherein when the first vertex is located on the sharp edge and the second vertex is located on a different sharp edge, determining an error for collapsing the candidate edge to a new vertex comprises computing the error such that the candidate edge is not collapsible.

8. The computer-implemented method of claim 1, wherein the error is a quadrics error.

9. The computer-implemented method of claim 1, wherein the three-dimensional polygon mesh provides a representation of a cityscape.

10. The computer-implemented method of claim 9, wherein the sharp edge is representative of a building edge in the representation of the cityscape.

11. A computer program product comprising a tangible non-transitory computer-readable medium storing computer-readable instructions for execution by one or more processors, causing the one or more processors to perform operations, the operations comprising:
   identifying a structural edge in the three-dimensional polygon mesh representative of a geographic area using plane detection;
   constructing a sharp edge in the three-dimensional polygon mesh at a detected plane intersection associated with the structural edge, the sharp edge comprising a straight chain of connected vertices in the three-dimensional polygon mesh;
   identifying a candidate edge for edge collapse, the candidate edge being associated with a first vertex and a second vertex;
   determining an error for collapsing the candidate edge to a new vertex, the error determined such that the new vertex is located on the sharp edge; and
   collapsing one or more edges in the three-dimensional polygon mesh based at least in part on the error;
   wherein the operation of constructing the sharp edge in the three-dimensional polygon mesh at the structural edge, comprises:
   identifying an edge segment to be constructed at a detected plane intersection between a first detected plane and a second detected plane;
   identifying a set of vertices for the edge segment, the set of vertices comprising one vertex from each of the first detected plane and the second detected plane closest to an end of the edge segment;
   determining a closing path for the edge segment based at least in part on the set of vertices; and
   modifying the three-dimensional polygon mesh based on the closing path.

12. The computer-program product of claim 11, wherein the operation of modifying the three-dimensional mesh based on the closing path for each edge segment to construct the sharp edge comprises:
   removing portions of the three-dimensional polygon mesh within the closing path; and
   constructing the sharp edge along the edge segment in the three-dimensional polygon mesh.

13. A computer-implemented method for mesh simplification of a three-dimensional polygon mesh, the method comprising:
   identifying, by one or more computing devices, a structural edge in the three-dimensional polygon mesh using plane detection;
   constructing, by the one or more computing devices, a sharp edge in the three-dimensional polygon mesh at the structural edge, the sharp edge comprising a straight chain of connected vertices in the three-dimensional polygon mesh;
   identifying, by the one or more computing devices, a candidate edge for edge collapse, the candidate edge being associated with a first vertex and a second vertex;
   determining, by the one or more computing devices, an error for collapsing the candidate edge to a new vertex, the error determined such that the new vertex is located on the sharp edge; and
   collapsing, by the one or more computing devices, one or more edges in the three-dimensional polygon mesh based at least in part on the error;
   wherein when the first vertex is located on the sharp edge and the second vertex is located on a different sharp edge, determining an error for collapsing the candidate edge to a new vertex comprises computing the error such that the candidate edge is not collapsible.

* * * * *